US009785497B1

(12) United States Patent
Cook et al.

(10) Patent No.: US 9,785,497 B1
(45) Date of Patent: Oct. 10, 2017

(54) PERFORMING SELF-HEALING TASKS USING INFORMATION TECHNOLOGY MANAGEMENT DATA

(71) Applicant: INTERNATIONAL BUSINESS MACHINES CORPORATION, Armonk, NY (US)

(72) Inventors: Cynthia R. Cook, Oxford, NC (US); Victoria L. Guerra, Yorktown Heights, NY (US); Victor R. Herrero, Poughkeepsie, NY (US); Zachary J. Conway Peterson, Glen Ellyn, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/275,650

(22) Filed: Sep. 26, 2016

(51) Int. Cl.
- *G06F 11/00* (2006.01)
- *G06F 11/07* (2006.01)
- *G06F 11/30* (2006.01)
- *G06F 11/32* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/0787* (2013.01); *G06F 11/3006* (2013.01); *G06F 11/3055* (2013.01); *G06F 11/327* (2013.01)

(58) Field of Classification Search
CPC .................................................. G06F 11/0793
USPC ............. 714/15, 16, 18, 25, 47.1, 45, 46, 57
See application file for complete search history.

(56) References Cited

U.S. PATENT DOCUMENTS

| | | | |
|---|---|---|---|
| 6,697,858 B1 * | 2/2004 | Ezerzer | H04L 41/0893 370/231 |
| 7,095,321 B2 * | 8/2006 | Primm | G08B 13/19656 340/3.1 |
| 7,171,689 B2 * | 1/2007 | Beavers | G06F 11/0709 714/E11.025 |
| 7,529,827 B2 | 5/2009 | Devraj et al. | |
| 8,365,009 B2 * | 1/2013 | Dournov | G06F 11/0709 709/223 |
| 2002/0116484 A1 * | 8/2002 | Podracky | H04L 41/069 709/223 |

* cited by examiner

*Primary Examiner* — Dieu-Minh Le
(74) *Attorney, Agent, or Firm* — John Pivnichny; Andrew D. Wright; Roberts Mlotkowski Safran Cole & Calderon, P.C.

(57) ABSTRACT

Systems and methods for performing self-healing tasks using information technology management data are disclosed. In aspects, a computer-implemented method of the invention comprises: storing alert data indicating that an alert condition has been detected at a client data center, the alert data including a monitoring situation; performing a matching function to determine whether the monitoring situation matches an assigned monitoring situation or is an unassigned monitoring situation; determining that the monitoring situation is unassigned; sending a ticket including a list of virtual engineers to the client data center; detecting a ticket update in a ticket database, the ticket update including an assignment of one of the virtual engineers to the monitoring situation; updating a monitoring situation database to include the assignment of the one of the virtual engineers; and initiating the one of the virtual engineers to resolve the monitoring situation.

19 Claims, 5 Drawing Sheets

PERFORMING SELF-HEALING TASKS USING INFORMATION TECHNOLOGY MANAGEMENT DATA

BACKGROUND

The present invention relates generally to information technology (IT) management and, more particularly, to systems and methods for performing self-healing tasks using IT management data.

Many enterprises require assistance managing and administering computer data centers. In general, a data center is a facility that centralizes an organization's information technology (IT) operations and equipment, and where it stores, manages and disseminates its data. Data centers may include, for example, financial management systems, payroll applications, customer relationship management systems, web services, resource planning systems, database applications, and other systems and tools. In general, data center administration is the process of establishing applications, servers, and networks, and ensuring their integrity, recoverability, security, availability, reliability, scalability and performance.

Various Information Technology (IT) Administrators may be required to manage a data center environment. Certain tools and software have been developed in an attempt to assist IT Administrators in the management of data centers, including software to automate certain IT management processes. In some instances, a service provider in communication with a client data center may provide so called "virtual engineers" (VEs) to react to monitoring system alerts and ticketing system service requests generated at a client data center. The VEs may automatically perform management steps using appropriate predetermined standard operating procedures (SOP) in response to alerts or requests generated at the client data center. The VEs may perform some tasks which would normally be performed by human system or IT Administrators to diagnose and remediate problems and to implement service requests. Such systems may utilize so called eBonding services to synchronize the service provider's alert and ticketing systems with client specific monitoring and ticketing systems. Such service providers may centrally store execution and configuration item data (e.g., server data), which is used to match VEs to system alerts and service requests, connect to target endpoint servers, and communicate with monitoring and ticketing systems.

Inevitably, problems are encountered which cause such VEs to fail. For example, automatically matching a request with an appropriate VE can be difficult due to inconsistencies in the types of requests received by the service provider. For example, the template for a request to address a shortage of available data storage space from a first client may be different from the template for a request to address a shortage of data storage space from a second client. Moreover, changes in the tools and systems utilized by client data centers may result in changes to the type and format of requests being received by the service provider.

SUMMARY

In an aspect of the invention, a computer-implemented method for performing self-healing tasks using information technology management data, includes: storing, in an alert database, alert data indicating that an alert condition has been detected at a client data center, the alert data including a monitoring situation; performing a matching function, by an alert processor, to determine whether the monitoring situation matches an assigned monitoring situation in a monitoring situation database, or is an unassigned monitoring situation; determining, by the alert processor, that the monitoring situation is an unassigned monitoring situation; sending a ticket including the monitoring situation and a list of virtual engineers to a ticketing system of the client data center; detecting a ticket update in a ticket database, the ticket update including an assignment of a select one of the virtual engineers to the monitoring situation; updating the monitoring situation database to include the assignment of the select one of the virtual engineers to the monitoring situation; and initiating the select one of the virtual engineers to resolve the monitoring situation.

In another aspect of the invention, there is a computer program product for performing self-healing tasks using information technology management data. The computer program product includes a computer readable storage medium having program instructions embodied therewith. The program instructions are executable by a computing device to cause the computing device to: provide access to a monitoring situation database including a list of assigned monitoring situations, wherein each of the assigned monitoring situations is associated with a virtual engineer programmed to address the respective assigned monitoring situation; determine that an alert ticket has been received, the alert ticket including an unassigned monitoring situation; send a ticket to a client data center, the ticket including a list of virtual engineers available to be assigned by a system administrator to the unassigned monitoring situation of the alert ticket; detect a ticket update including an assignment of a select one of the virtual engineers to the unassigned monitoring situation of the alert ticket; and update the monitoring situation database based on the assignment.

In another aspect of the invention, there is a system for performing self-healing tasks using information technology management data. The system includes: a CPU, a computer readable memory and a computer readable storage medium associated with a computing device; program instructions to receive alert data indicating that an alert condition has been detected at a client data center, the alert data including identification of a monitoring situation; program instructions to perform a matching function to determine whether the monitoring situation matches an assigned monitoring situation in a monitoring situation database, or is an unassigned monitoring situation; program instructions to determine that the monitoring situation is an unassigned monitoring situation; program instructions to send a ticket including the monitoring situation and a list of virtual engineers to a ticketing system of the client data center; program instructions to detect a ticket update in a ticket database, the ticket including an assignment of a select one of the virtual engineers to the monitoring situation; program instructions to update the monitoring situation database to include the assignment of the select one of the virtual engineers to the monitoring situation; and program instructions to initiate the select one of the virtual engineers to resolve the monitoring situation. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to information technology (IT) management, and more particularly to systems and methods for performing self-healing tasks using IT management data. In embodiments, a data management system (data management center) stores all virtual engineer (VE) information (i.e., workflow states and matching criteria used to assign alerts/tasks), execution information, and server information (e.g., configuration management database (CMDB)) centrally. The data management system also provides synchronization between client specific monitoring and ticketing systems and a monitoring and ticketing system of the data management system. Special VEs of the data management system are utilized which: evaluate execution data to identify problems; invoke VEs to remediate problems; and open and assign synchronized tickets to communicate and collaborate with human administrators of client data centers to fix problems, collect missing CMDB data, and collect missing information to assign alerts and tasks and increase VE productivity.

In an exemplary implementation, when an alert is received for an unassigned monitoring situation (a monitoring situation not assigned to a specific VE), a VE creates a ticket containing the monitoring situation (e.g., a value known to the monitoring team on the client account representing a situation which is monitored by the client monitoring system) and a list of available VEs which may be able to mitigate the alerting condition, and assigns the ticket to the monitoring team (e.g., the ticket enters a ticketing queue). The monitoring team answers the question in the ticket (i.e., identifies the VE which should handle the alert) and updates the ticket. A different VE then detects that the ticket is updated, reads the response and updates the selected VEs "matching criteria" to handle the monitoring situation going forward, thereby self-healing the system. A similar approach can be used to self-heal other aspects of the environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
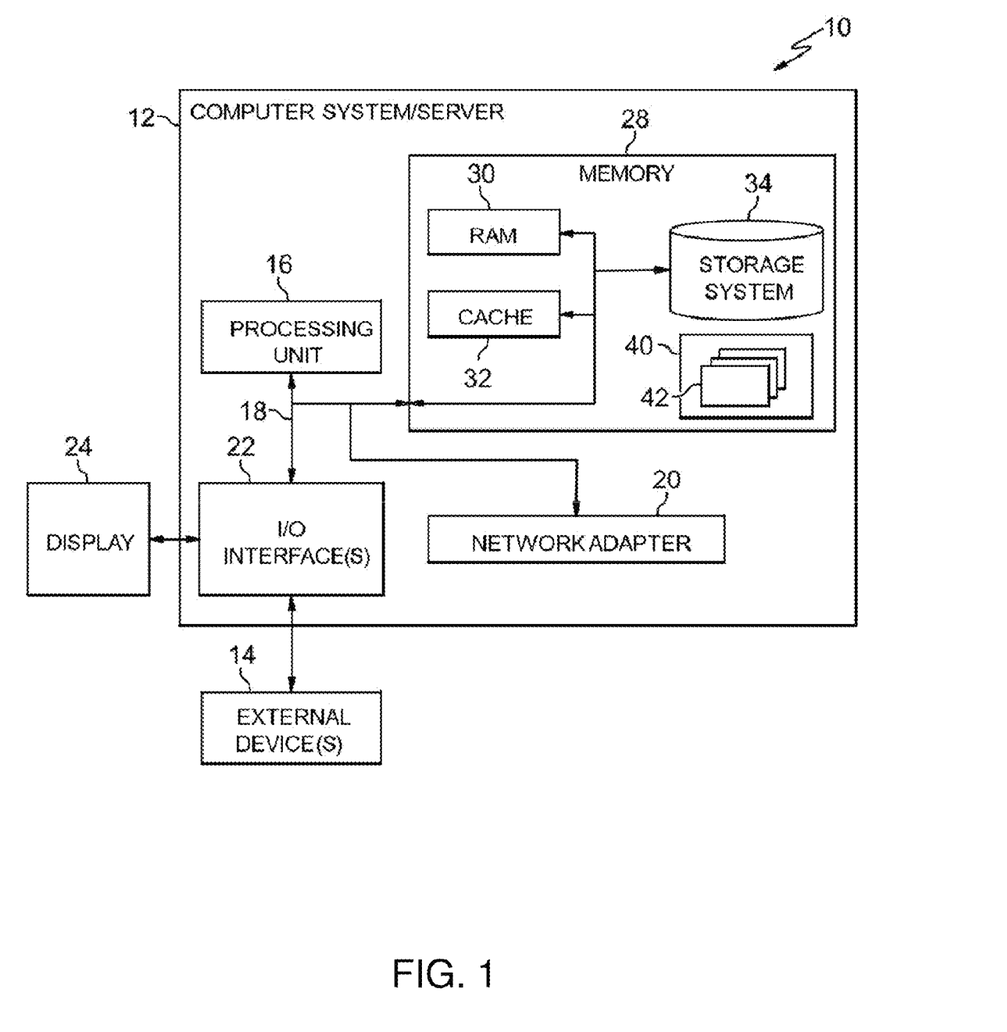
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
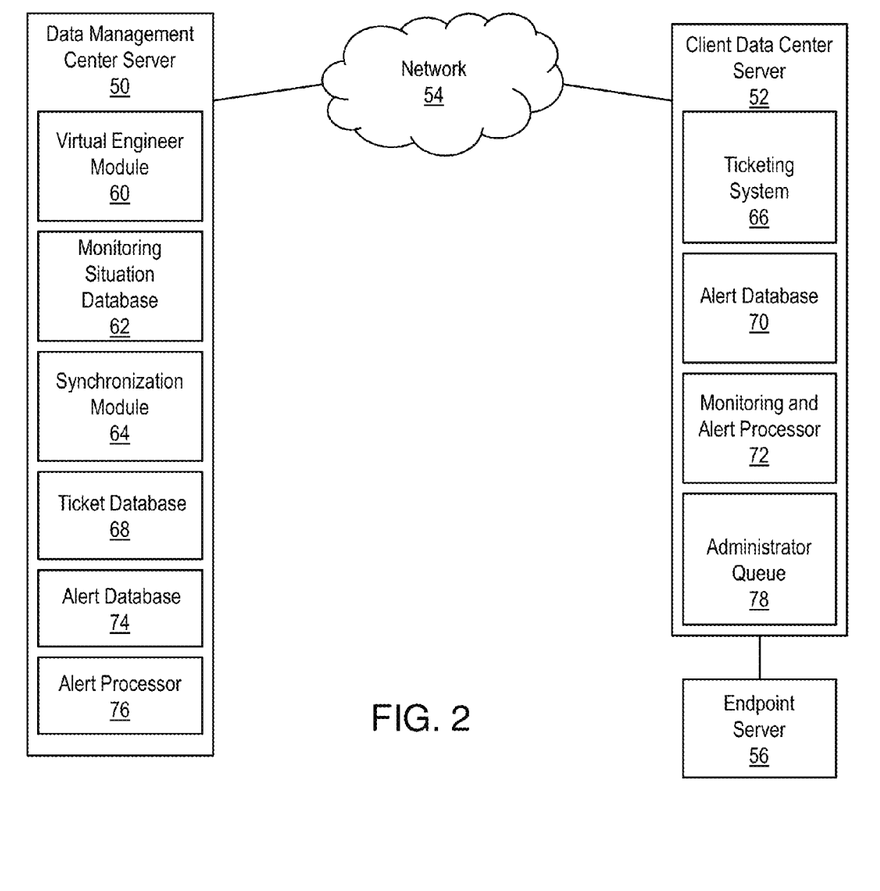
FIG. 2 shows an exemplary environment in accordance with aspects of the invention.

FIG. 2 shows an exemplary environment in accordance with aspects of the invention. The environment includes a data management center server 50 in communication with one or more client data centers (e.g., client data center server 52). The data management center server 50 may comprise elements of computer system 12 of FIG. 1, and may be connected to one or more computer data centers (e.g., client data center server 52) via a network 54 using the network adapter 20 of FIG. 1. The data management center server 50 may be configured as a special purpose computing device that is part of a data management center system for providing management and administration assistance to one or more client data centers.

The network 54 may be any suitable communication network or combination of networks, such as a local area network (LAN), a general wide area network (WAN), and/or a public network (e.g., the Internet). The client data center server 52 may also comprise elements of computer system 12 of FIG. 1. The client data center server 52 may be configured as a special purpose computing device that is part of a client data center system for monitoring one or more endpoint servers 56.

Still referring to FIG. 2, a virtual engineer module 60 of the data management center server 50 is configured to store data regarding a plurality of virtual engineers (VEs). The virtual engineer module 60 may include one or more VE program modules (e.g., program module 42 of FIG. 1) executed by the data management center server 50. As used herein, the term "virtual engineer" should be understood to mean a computerized tool for automatically performing management steps that would otherwise be performed by one or more human administrators of a data center. In embodiments, the virtual engineer module 60 is configured to use appropriate predetermined standard operating procedures (SOP) for corresponding monitoring situations stored in a monitoring situation database 62 to enable VEs to automatically respond to alerts or requests generated at a client data center (e.g., client data center server 52). In aspects, VEs in virtual engineer module 60 are configured to perform standard operating procedures for a variety of monitored situations stored in the monitoring situation database 62. By way of example, the client data center server 52 may regularly monitor the storage capacity of a file system to determine if the capacity is about to be exceeded. A particular VE may be assigned to this monitoring situation, and will be configured to remediate the storage capacity problem (e.g., deleting unnecessary data from the file system).

In aspects, a synchronization module 64 of the data management center server 50 is in communication with a ticketing system 66 of the client data center server 52, and is configured to synchronize ticketing data (e.g., incident ticket data) between the ticketing system 66 of the client data center server 52 and a ticketing database 68 of the data management center server 50. In aspects, the synchronization module 64 is also in communication with an alert database 70 of a monitoring and alert processor 72 at the client data center server 52, and synchronizes alert data between the alert database 70 and an alert database 74 at the data management center server 50.

In embodiments, an alert processor 76 of the data management center server 50 is in communication with the monitoring situation database 62, and is configured to match an appropriate VE from the virtual engineer module 60 to a monitoring situation (using data from monitoring situation database 62) received at the alert database 74. If a match cannot be performed, a ticket is sent from the ticketing database 68 at the data management center server 50 to the ticketing system 66 of the client data center server 52, where it is then assigned to an administrator queue 78.

It should be understood that the data management center server 50 may include some or all of the computer components shown, including the virtual engineering module 60, the monitoring situation database 62, the synchronization module 64, the ticket database 68, the alert database 74 and the alert processor 76. Alternatively, the computer components may be separate components in communication with the client data center server 52. Accordingly, the data management center server 50 and the computer components shown may each include elements of the computer device 12 depicted in FIG. 1. Likewise, it should be understood that the client data center server 52 may include some or all of the computer components shown, including the ticketing system 66, the alert database 70, the monitoring and alert processor 72 and the administrator queue 78; or the components may be separate computer components in communication with the client data center server 52. Accordingly, the client data center server 52 and the components shown may include elements of the computer device 12 depicted in FIG. 1. One of ordinary skill in the art would understand that various computer component configurations may be possible, and the present invention is not intended to be limited by the general computer component configuration shown in FIG. 2.

Details regarding the manner in which VEs of the data management server 50 provide management services to the client data center server 52 are described with reference to FIGS. 3A and 3B, which show a flowchart of a method in accordance with aspects of the invention. Steps of the method of FIGS. 3A and 3B may be performed in the environment illustrated in FIG. 2, and are described with reference to elements shown in FIG. 2.

At step 300, an alert condition is detected by a client monitoring and alert system (e.g., client monitoring and alert processor 72). Client monitoring and alert processor 72 may be a conventional monitoring and alert system utilized by client data centers to manage and monitor the performance and operation of various data center components.

At step 302, alert data regarding the alert condition detected at step 300 is stored in the alert database 70 by the client monitoring and alert processor 72. The alert data may include information such as the "monitoring situation" (e.g., a situation that is being monitored by the monitoring and alert processor 72), endpoint server hostname and IP address, endpoint server operating system, type of server (e.g., DGMS, storage, middleware, etc.), file system affected, percent file system full, alert threshold, etc.

At step 304, the synchronization module 64 recognizes that the alert data has posted to the alert database 70.

Synchronization module 64 may comprise a conventional synchronization system, such as eBonding systems, to synchronize data between databases in real time or near real time. In embodiments, synchronization module 64 utilizes conventional eBonding techniques to perform step 304.

At step 306, the synchronization module 64 synchronizes the alert data at the alert database 70 with data in the alert database 74 at the data management center (e.g., server 50). In aspects, steps 304 and 306 may be performed nearly simultaneously as the synchronization module 64 continuously synchronizes data between the alert database 70 and the alert database 74.

At step 308, the alert processor 76 picks up the alert data from the alert database 74 and performs a VE matching function. In embodiments, the VE matching function includes comparing the monitoring situation identified in the alert data with assigned monitoring situations in the monitoring situation database 62 to determine if the monitoring situation identified in the alert data matches an assigned monitoring situation. The term "assigned monitoring situation" should be understood to mean that a VE from the virtual engineer module 60 is already assigned to the monitoring situation, and is configured to resolve the monitoring situation.

At step 310, if the monitoring situation identified in the alert data matches an assigned monitoring situation in the monitoring situation database 62, then the VE assigned to the assigned monitoring situation is a match for the alert data and can be initiated by the alert processor 76 to resolve the alert condition detected at step 300. It should be understood that matching can be performed using lookup tables or other matching tools.

At step 312, if the alert processor 76 does not match a VE to the monitoring situation at step 308, then the alert processor 76 recognizes the monitoring situation as an unassigned monitoring situation, and initiates a first self-healing VE 90 (depicted in FIG. 4) to create a ticket in the ticket database 68 for the unassigned monitoring situation. The first self-healing VE 90 may be a VE from virtual engineer module 60, or may be a separate VE associated with the data management center server 50. In aspects, the ticket includes all of the alert data stored in the alert database 74 (from step 306), including the monitoring situation, as well as a list of VEs which may be utilized to resolve or address the monitoring situation. The first self-healing VE 90 may perform a filtering function against all VEs available in the virtual engineer module 60, in order to develop a filtered list of VEs that may be utilized to resolve or address the alert condition at issue. The filtering function may filter available VEs based on a number of factors, including the type of operating system utilized in conjunction with the alert condition and the type of technology associated with the alert condition (DBMS, storage, middleware, etc.).

At step 314, the synchronization module 64 sends the ticket created at step 312 to the ticketing system 66 of the client data center server 52.

At step 316, the ticketing system 66 receives the ticket created at step 312 and assigns the ticket to the administrator queue 78.

Figure 3A:
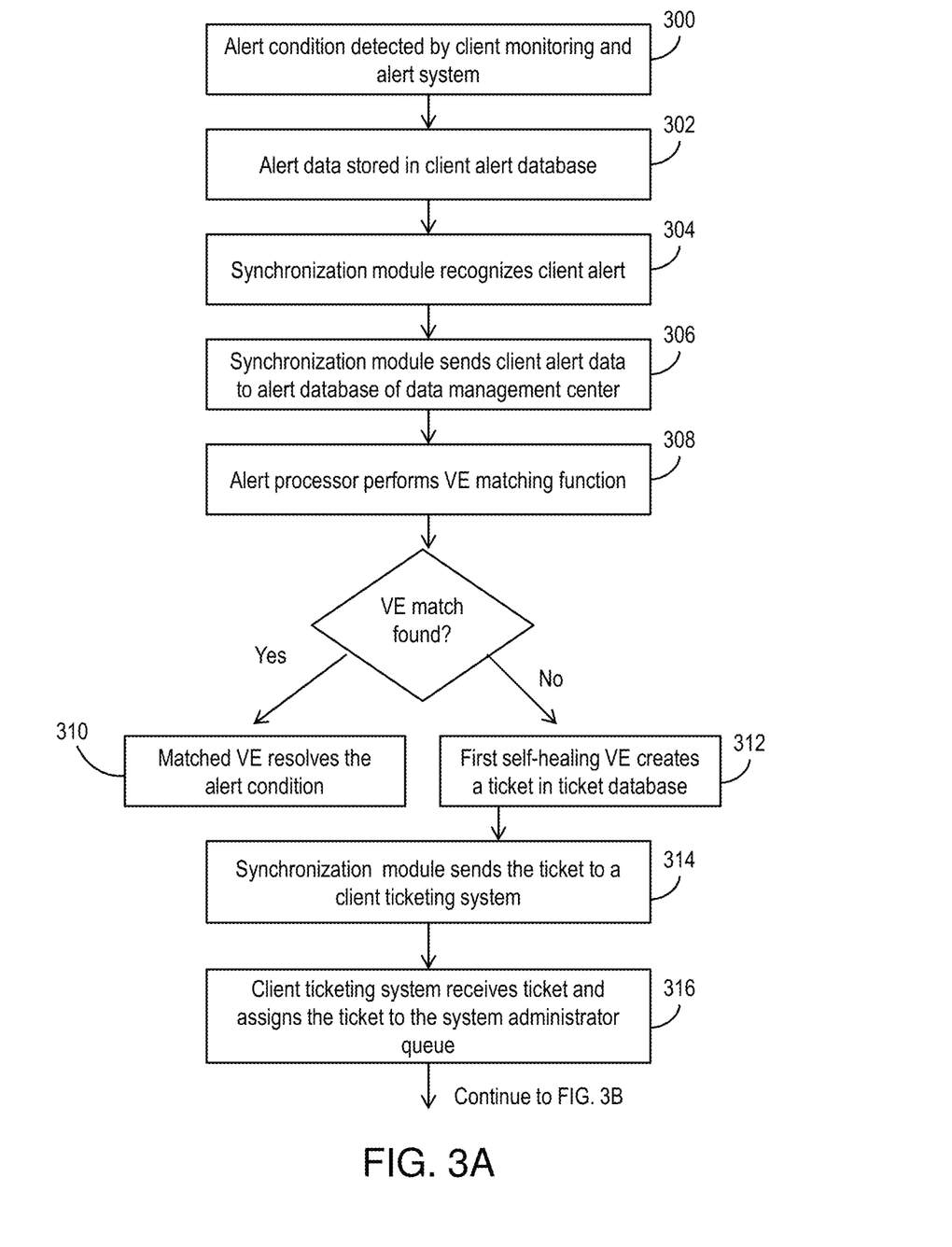
FIGS. 3A and 3B show a flowchart of steps of a method in accordance with aspects of the invention.
Figure 3B:
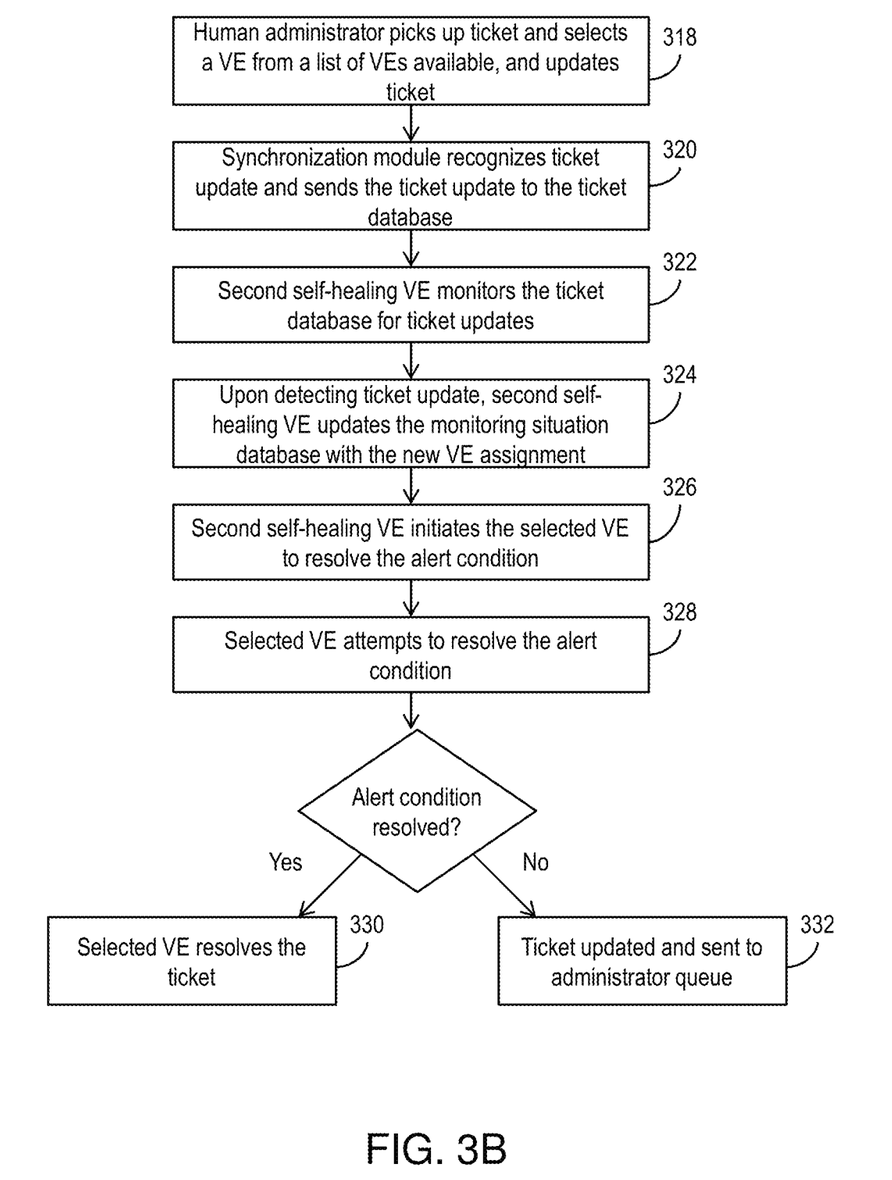

Referring to FIG. 3B, at step 318, a human administrator "picks up" or otherwise obtains the ticket created at step 312 from the administrator queue 78 and assigns a selected VE 92 (depicted in FIG. 4) from the list of VEs (provided with the ticket) to the monitoring situation identified in the ticket. In embodiments, the human administrator will assign a selected VE 92 which can be utilized to resolve or address the alert condition at issue (e.g., the monitoring situation at issue) using predetermined SOPs implemented by the selected VE 92. The human administrator then updates the ticket with this virtual engineer assignment information, resulting in ticket updates including a new VE assignment (the selected VE 92 assigned to the particular monitoring situation at issue). Optionally, at step 318, a human administrator may choose to skip assigning a selected VE (e.g., no adequate choice in the list of VEs) and manually resolve the alert condition at issue, and the self-healing process ends.

At step 320, the synchronization module 64 recognizes the ticket updates and sends the ticket updates to the ticket database 68. In embodiments, synchronization module 64 utilizes conventional eBonding techniques to perform step 320.

At step 322, a second self healing VE 94 (depicted at FIG. 4) monitors the ticket database 68 for ticket updates, and detects the ticket update of step 320. In embodiments, this step is performed periodically, or continuously, such that steps 320 and 322 occur nearly simultaneously.

At step 324, upon detecting the ticket update at step 322, the second self healing VE 94 updates the monitoring situation database 62 with the new VE assignment. Accordingly, any new tickets from the ticketing system 66 for the same monitoring situation identified in the alert data (at step 306) are recognized by the alert processor 76 as matching the selected VE 92. In this manner, future alerts regarding the same alert condition may be handled automatically by the selected VE 92 upon matching of the selected VE 92 with the monitoring situation at issue.

At step 326, the second self healing VE 94 initiates the selected VE 92 to resolve the alert condition originally detected at step 300. As previously discussed, VEs perform management steps using appropriate predetermined standard operating procedures in response to alerts or requests generated at the client data center 52. The VEs may perform some tasks which would normally be performed by human system or IT Administrators to diagnose and remediate problems and to implement service requests. Accordingly, at step 326, the selected VE 92 performs one or more steps using appropriate predetermined standard operating procedures (which may be stored with the selected VE 92) to resolve the alert condition. By way of example, the selected VE 92 may purge data from a data storage device when the alert condition indicates that the data storage device is 98% full.

At step 328 the selected VE 92 attempts to resolve the alert condition identified at step 300.

At step 330, if the selected VE 92 successfully resolves the alert condition, then the selected VE 92 will resolve the ticket (e.g., close the ticket) and the self-healing process ends.

At step 332, if the selected VE 92 does not resolve the ticket (does not successfully resolves the alert condition), then the ticket is updated by the second self healing VE 94 to indicate that the selected VE 92 was not successful in resolving the ticket, and the updated ticket is sent to the administrator queue 78 to be resolved by a human administrator. Optionally, following step 332, the self-healing process can start over at step 314 (i.e., the synchronization module 64 sends the updated ticket from step 332 to the client ticketing system 66). Thus it can be understood that at step 316, the ticketing system 66 will assign the updated ticket from step 332 to the system administrator queue 78, at step 318 a human administrator will pick up the updated ticket and will assign a new selected VE from a list of available VEs, and steps 320-328 will proceed as described above. The steps of the self-healing process described herein may be repeated any number of times until a selected VE is successful in resolving an alert condition at step 330, or a system administrator chooses to skip selecting a VE and manually resolves the alert condition at issue.

Figure 4:
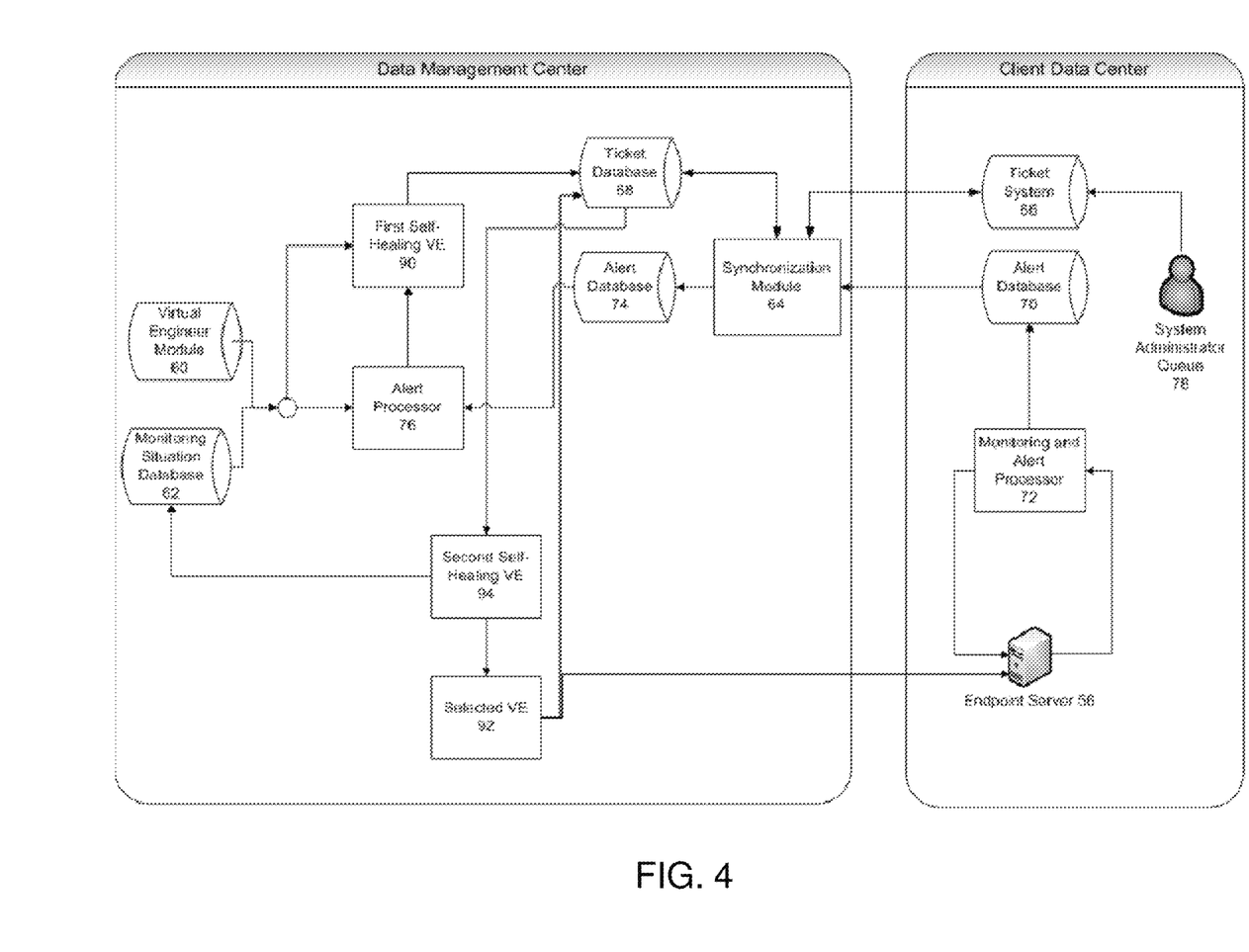
FIG. 4 is a diagram of a system for implementing self-healing management tasks in accordance with aspects of the invention.

FIG. 4 shows a diagram of a system for implementing self-healing management tasks in accordance with aspects of the invention. Elements of the FIG. 4 system correspond with elements in the environment illustrated in FIG. 2, and are described with reference to elements shown in FIG. 2.

An exemplary self-healing task scenario in accordance with aspects of the present invention will now be discussed with reference to FIGS. 3A, 3B, and 4. In the scenario of FIG. 4, a data management center (operator of data management center server 50) is in communication with a client data center (including client data center server 52) via a network 54 (depicted in FIG. 2), and provides IT management services to the client data center. Initially, the monitoring and alert processor 72 at the client data center detects an alert condition associated with the endpoint server 56 (e.g., step 300 of FIG. 3A). Specifically, the monitoring and alert processor 72 detects that temporary file storage for a file system of the endpoint server 56 is 98% full. The monitoring and alert processor 72 then stores new alert data associated with the alert condition (file system/tmp is 98% full), including information identifying the monitoring situation (temporary file storage is 98% full) in the client center alert database 70 (e.g., step 302 of FIG. 3A). The synchronization module 64 of the data management center automatically recognizes that the new alert data has posted to the client center alert database 70 (step 304 of FIG. 3A), and updates the alert database 74 at the data management center (step 306 of FIG. 3A) with the new alert data.

The alert processor 76 of the data management center recognizes that the alert database 74 has been updated with the new alert data, and automatically performs a VE matching function (step 308 of FIG. 3A). In the present scenario, the alert processor 76 reviews monitoring situations in the monitoring situation database 62 of the data management center to determine if any of the VEs in the virtual engineer module 60 are listed as being assigned to the monitoring situation at issue (i.e., temporary file storage is 98% full).

In the exemplary scenario of FIG. 4, the data management center and the client data center have already agreed on procedures to take (SOPs) when a temporary file storage system is 98% full, and a table in the monitoring situation database 62 lists the VE (hereafter temporary storage VE) as being assigned to this particular monitoring situation. However, due to system upgrades, the format of the data alert is different from prior alerts of the same kind, such that the alert processor 76 does not recognize the new data alert information includes an assigned monitoring situation (i.e., temporary file storage is 98% full). Accordingly, the first self healing VE 90 proceeds to create a new ticket (incident ticket) in the ticket database 68, including a list of VEs in the virtual engineer module 60 and the new alert data (e.g., including data identifying the monitoring situation at issue as "temporary file storage is 98% full"), in accordance with step 312 of FIG. 3A. The list of VEs includes the temporary storage VE.

The synchronization module 64 automatically detects the presence of the new ticket in the ticket database 68 and sends the new ticket to the client ticketing system 66 (e.g., step 314 of FIG. 3A). The client ticketing system 66 in turn assigns the ticket to an appropriate administrator queue 78 (e.g., step 316 of FIG. 3A). A human administrator assigned to the administrator queue 78 picks up the ticket (i.e., reviews the ticket information), including the list of VEs available and the monitoring situation at issue. The administrator will be able to see that the temporary storage VE in the list of available VEs is the appropriate VE to handle the monitoring situation at issue, and can then assign the temporary storage VE to resolve the alert condition and update the ticketing information to include this VE assignment (e.g., step 318 of FIG. 3B). Upon detecting that a ticket has been updated, the synchronization module 64 then automatically updates the ticket database 68 with the updated ticket information (including the VE assignment) in accordance with step 320 of FIG. 3B.

The second self-healing VE monitoring the ticket database 68 will recognize that updated ticket information has posted, and will update the monitoring situation database 62 with the new VE assignment (i.e., the monitoring situation database 62 will list the temporary storage VE as being assigned to resolve the condition of a temporary file system being 98% full) in accordance with steps 322 and 324 of FIG. 3B. Thus, any future alert condition of "file system/tmp is 98% full" will be recognized by the alert processor 76 as being matched with the temporary storage VE in the virtual engineer module 60 (e.g., step 308 of FIG. 3A). The temporary storage VE will then proceed to resolve the alert condition and close the ticket in accordance with steps 328 and 330 of FIG. 3A.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, data centers requiring IT management. In return, the service provider can receive payment from the customer(s) under a subscription and/or fee agreement and/or the service provider can receive payment from the sale of advertising content to one or more third parties.

In still another embodiment, the invention provides a computer-implemented method for performing self-healing tasks using information technology management data. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for performing self-healing tasks using information technology management data, comprising:
   detecting, by a synchronization module of a data management center server, alert data at a first alert database at a remote client data center, wherein the first alert database is continuously monitored by the synchronization module;
   storing, by the data management center server, the alert data in an alert database of the data management center server, wherein the alert data indicates that an alert condition has been detected at the client data center, the alert data including a monitoring situation;
   performing a matching function, by an alert processor of the data management center server, to determine whether the monitoring situation matches an assigned monitoring situation in a monitoring situation database, or is an unassigned monitoring situation;
   determining, by the alert processor, that the monitoring situation is an unassigned monitoring situation;
   sending, by the data management center server, a ticket including the monitoring situation and a list of virtual engineers to a ticketing system of the client data center;
   detecting, by the data management center server, a ticket update in a ticket database of the data management center server, the ticket update including an assignment of a select one of the virtual engineers to the monitoring situation;
   updating, by the data management center server, the monitoring situation database to include the assignment of the select one of the virtual engineers to the monitoring situation; and
   initiating the select one of the virtual engineers to resolve the monitoring situation.

2. The method of claim 1, the storing the alert data is performed by the synchronization module.

3. The method of claim 1, further comprising a first self-healing virtual engineer generating the ticket.

4. The method of claim 1, wherein the detecting the ticket update comprises determining, by the synchronization module, that a ticket system at the client data center includes the ticket update; and
   sending, by the synchronization module, the ticket update to the ticket database.

5. The method of claim 1, further comprising monitoring, by a second self-healing virtual engineer, the ticket database for the ticket update, wherein the detecting the ticket update is performed by the second self-healing virtual engineer.

6. The method of claim 5, wherein the updating the monitoring situation database and the initiating the select one of the virtual engineers to resolve the monitoring situation are performed by the second self-healing virtual engineer.

7. The method of claim 1, further comprising determining that the alert condition was resolved by the select one of the virtual engineers.

8. The method of claim 1, further comprising:
   determining that the alert condition was not resolved by the select one of the virtual engineers;
   updating the ticket to generate an updated ticket; and
   sending the updated ticket to the ticketing system of the client data center.

9. A computer program product for performing self-healing tasks using information technology management data, the computer program product comprising a computer readable storage medium having program instructions embodied therewith, the program instructions executable by a computing device to cause the computing device to:
   receive, by a synchronization module of the computing device, alert data from a remote first alert database at a client data center, wherein the first alert database is continuously monitored by the synchronization module;
   store, by the synchronization module, the alert data in a ticket database of the computing device;
   provide access to a monitoring situation database including a list of assigned monitoring situations, wherein each of the assigned monitoring situations is associated with a virtual engineer programmed to address the respective assigned monitoring situation;
   determine that the alert data has been received, the alert data including an unassigned monitoring situation;
   send a ticket to client data center, the ticket including a list of virtual engineers available to be assigned by a system administrator to the unassigned monitoring situation of the alert data;
   detect a ticket update including an assignment of a select one of the virtual engineers to the unassigned monitoring situation of the alert ticket;
   update the monitoring situation database based on the assignment; and
   initiate the select one of the virtual engineers to resolve the unassigned monitoring situation.

10. The computer program product of claim 9, wherein the program instructions further cause the computing device to:
    determine that the alert condition was not resolved by the select one of the virtual engineers;
    update the ticket to generate an updated ticket; and
    send the updated ticket to the client data center.

11. The computer program product of claim 9, wherein the program instructions further cause the computing device to generate the ticket, wherein the list of virtual engineers is a filtered list of virtual engineers utilized to resolve or address the unassigned monitoring situation.

12. The computer program product of claim 9, wherein the program instructions further cause the computing device to generate the ticket via a first virtual engineer.

13. The computer program product of claim 9, wherein the program instructions further cause the computing device to:
    determine, by the synchronization module, that a ticket system at the client data center includes the ticket update; and
    send, by the synchronization module, the ticket update to the ticket database.

14. The computer program product of claim 13, wherein the program instructions further cause the computing device to monitor, by a second self-healing virtual engineer, the ticket database for the ticket update, wherein the detecting the ticket update is performed by the second self-healing virtual engineer.

15. The computer program product of claim 14, wherein the updating the monitoring situation database and the initiating the select one of the virtual engineers to resolve the monitoring situation are performed by the second self-healing virtual engineer.

16. A system for performing self-healing tasks using information technology management data, comprising:
    a CPU, a computer readable memory and a computer readable storage medium associated with a computing device;

program instructions to continuously monitor, by a synchronization module of the computing device, a remote client data center for alert data;

program instructions to receive, by the synchronization module, the alert data indicating that an alert condition has been detected at the remote client data center, the alert data including identification of a monitoring situation;

program instructions to perform a matching function, by an alert database of the computing device, to determine whether the monitoring situation matches an assigned monitoring situation in a monitoring situation database, or is an unassigned monitoring situation;

program instructions to determine, by the alert database, that the monitoring situation is an unassigned monitoring situation;

program instructions to send a ticket including the monitoring situation and a list of virtual engineers to a ticketing system of the remote client data center;

program instructions to detect a ticket update in a ticket database of the computing device, the ticket including an assignment of a select one of the virtual engineers to the monitoring situation;

program instructions to update the monitoring situation database to include the assignment of the select one of the virtual engineers to the monitoring situation; and program instructions to initiate the select one of the virtual engineers to resolve the monitoring situation, wherein the program instructions are stored on the computer readable storage medium for execution by the CPU via the computer readable memory.

17. The system of claim 16, further comprising:

program instructions to determine, by the synchronization module, that the ticketing system at the remote client data center includes the ticket update; and program instructions to send, by the synchronization module, the ticket update to the ticket database of the computing device.

18. The system of claim 17, further comprising program instructions to monitor, by a second self-healing virtual engineer, the ticket database of the computing device for the ticket update, wherein the detecting the ticket update is performed by the second self-healing virtual engineer.

19. The system of claim 16, further comprising:

program instructions to determine that the alert condition was not resolved by the select one of the virtual engineers;

program instructions to update the ticket to generate an updated ticket; and program instructions to send the updated ticket to the ticketing system of the remote client data center.

* * * * *